(12) United States Patent
Okamoto et al.

(10) Patent No.: US 8,831,673 B2
(45) Date of Patent: Sep. 9, 2014

(54) USER INFORMATION ADMINISTRATION SYSTEM AND USER INFORMATION ADMINISTRATION METHOD

(75) Inventors: Takeshi Okamoto, Tokyo (JP); Hiroyuki Hosono, Tokyo (JP); Takeshi Terayama, Tokyo (JP); Takaaki Sato, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 215 days.

(21) Appl. No.: 13/515,107

(22) PCT Filed: Dec. 9, 2010

(86) PCT No.: PCT/JP2010/072138
§ 371 (c)(1),
(2), (4) Date: Jun. 29, 2012

(87) PCT Pub. No.: WO2011/071115
PCT Pub. Date: Jun. 16, 2011

(65) Prior Publication Data
US 2012/0258765 A1 Oct. 11, 2012

(30) Foreign Application Priority Data

Dec. 11, 2009 (JP) ................ P2009-281661

(51) Int. Cl.
*H04W 88/08* (2009.01)
*H04W 24/00* (2009.01)
*H04B 7/26* (2006.01)
*H04W 16/24* (2009.01)
*H04W 84/08* (2009.01)
*H04W 60/00* (2009.01)

(52) U.S. Cl.
CPC ................. *H04W 60/00* (2013.01)
USPC ........................................ 455/524

(58) Field of Classification Search
CPC ..... H04W 88/08; H04W 24/00; H04W 16/24; H04W 84/08; H04B 7/26
USPC ........................................ 455/524
See application file for complete search history.

(56) References Cited

U.S. PATENT DOCUMENTS 8,412,176 B2 *  4/2013  Rajan .................. 455/422.1
8,452,282 B2 *  5/2013  Masuda et al. ........... 455/435.1

(Continued)

FOREIGN PATENT DOCUMENTS

| JP | 2003 018649 | 1/2003 |
| JP | 2004 336424 | 11/2004 |
| JP | 2009 159355 | 7/2009 |
| WO | 2009 123235 | 10/2009 |

OTHER PUBLICATIONS

International Preliminary Report on Patentability and Written Opinion issued Jul. 19, 2012 in PCT/JP2010/072138 filed Dec. 9, 2010.

(Continued)

*Primary Examiner* — Bobbak Safaipour
(74) *Attorney, Agent, or Firm* — Oblon, Spivak, McClelland, Maier & Neustadt, L.L.P.

(57) ABSTRACT

A base station outputs annunciation information which corresponds to a plurality of radio cells established by a 3G public base station and an LTE public base station and which is different from annunciation information output from the 3G public base station and the LTE public base station into a target region X and forms a radio cell. A mobile station that enters the radio cell receives the annunciation information of the radio cell and executes a position registration process. An information administration device can thereby find the mobile station based on the position registration process even in the environment where a plurality of radio cells to which different frequencies are assigned are established geographically overlapping with one another.

4 Claims, 5 Drawing Sheets

(56) References Cited

U.S. PATENT DOCUMENTS

| | | | |
|---|---|---|---|
| 8,725,083 B2* | 5/2014 | Yavuz et al. | 455/69 |
| 2004/0005897 A1* | 1/2004 | Tomoe et al. | 455/450 |
| 2007/0097938 A1* | 5/2007 | Nylander et al. | 370/338 |
| 2007/0097939 A1* | 5/2007 | Nylander et al. | 370/338 |
| 2007/0298824 A1* | 12/2007 | Ostman et al. | 455/522 |
| 2008/0304451 A1* | 12/2008 | Thompson | 370/331 |
| 2011/0117913 A1* | 5/2011 | Masuda et al. | 455/435.1 |

OTHER PUBLICATIONS

International Search Report issued on Feb. 15, 2011 in PCT/JP10/072138 filed on Dec. 9, 2010.

Office Action mailed Jun. 4, 2014, in Chinese Patent Application No. 201080055325.X (with English-language translation).

* cited by examiner

USER INFORMATION ADMINISTRATION SYSTEM AND USER INFORMATION ADMINISTRATION METHOD

TECHNICAL FIELD

The present invention relates to a user information administration system and a user information administration method for mobile stations.

BACKGROUND ART

In a communication system of mobile stations, a plurality of frequencies (bands, carriers) are used in order to increase the capacity to accommodate mobile stations in the communication system as a whole. A mobile station is located in a cell to which one of the frequencies is assigned, and performs communication through the frequency of the cell. Such a communication system using a plurality of frequencies is disclosed in Patent Literature 1, for example.

CITATION LIST

Patent Literature

PTL 1: Japanese Unexamined Patent Publication No. 2003-18649

SUMMARY OF INVENTION

Technical Problem

There is a demand for finding only the mobile station located within a given target region among the mobile stations spread over a plurality of cells. In this case, one possible approach is to cause all mobile stations in a plurality of cells including the target region to perform positioning using GPS (Global Positioning System) function from the network side and then specify the mobile station located within the target area based on the positioning results. However, the mobile station not having the GPS function cannot perform positioning, and it is thus not exhaustive. Further, because the target range is all the cells including the target region, the mobile stations outside the target region of which positions need not be specified are also made to perform positioning by the GPS function, which is not efficient. Further, in the case where positioning using the GPS function is performed indoors, measurement error is likely to be large, which is not accurate.

In light of the above problem, an object of the present invention is to provide a user information administration system and a user information administration method capable of finding a mobile station located within a given target region among mobile stations located in individual cells in the environment where a plurality of different cells to which different frequencies are assigned are established geographically overlapping with one another.

Solution to Problem

To solve the above problem, a user information administration system according to the present invention is a user information administration system including a first base station for controlling communication of mobile stations located in a first region with a plurality of frequencies assigned, a second base station having a communication range of a second region within the first region and smaller than the first region, and an information administration device connected for communication with the second base station, in which the second base station includes an annunciation information output module that outputs annunciation information different from annunciation information output from the first base station to the second region, a response information receiving module that receives response information output by a mobile station upon detecting a change of the annunciation information from the mobile station, and a response information transmitting module that transmits the response information received by the response information receiving module to the information administration device, and the information administration device includes a response information acquisition module that acquires the response information transmitted from the response information transmitting module, a mobile station finding module that finds the mobile station within the second region based on the acquired response information, and an output module that outputs a finding result by the mobile station finding module.

Further, a user information administration method according to the present invention is a user information administration method that is executed in a user information administration system including a first base station for controlling communication of mobile stations located in a first region with a plurality of frequencies assigned, a second base station having a communication range of a second region within the first region and smaller than the first region, and an information administration device connected for communication with the second base station, the method including an annunciation information output step of outputting annunciation information different from annunciation information output from the first base station to the second region by the second base station, a response information receiving step of receiving response information output by a mobile station upon detecting a change of the annunciation information from the mobile station by the second base station, a response information transmitting step of transmitting the response information received in the response information receiving step to the information administration device by the second base station, a response information acquisition step of acquiring the response information transmitted in the response information transmitting step by the information administration device, a mobile station finding step of finding the mobile station within the second region based on the acquired response information by the information administration device, and an output step of outputting a finding result in the mobile station finding step by the information administration device.

According to this invention, the second base station outputs the annunciation information different from annunciation information output from the first base station to the second region, and receives the response information transmitted from the mobile station within the second region. The information administration device can find the mobile station based on the response information. In this manner, it is possible to find the mobile station even in the environment where a plurality of different cells to which different frequencies are assigned are established geographically overlapping with one another.

Further, it is preferred that the annunciation information output module sequentially outputs annunciation information corresponding to each frequency in a specified order for each of a plurality of frequencies set by the first base station. This eliminates the need to implement a wireless communication device that outputs the annunciation information corresponding to each frequency and receives the response information for each of the frequencies, thus allowing a simple configuration.

Further, it is preferred that, in the second base station, at least one of Routing Area information different from Routing Area information set by the first base station and Location Area information different from Location Area information set by the first base station is set for each of the plurality of frequencies, and the annunciation information output module outputs the annunciation information based on the set information. It is thereby possible to easily set the annunciation information different from annunciation information of other radio cells with use of the information provided for all mobile stations.

Further, it is preferred that the mobile station finding module further calculates dynamic state information of the mobile station based on the finding result of the mobile station, including a finding result of the mobile station obtained from another base station, and the output module further outputs the dynamic state information calculated by the mobile station finding module. In this manner, the dynamic state information of the mobile stations can be acquired in an exhaustive manner from the finding result of the mobile station.

Advantageous Effects of Invention

According to the present invention, it is possible to find a mobile station even in the environment where a plurality of different radio cells to which different frequencies are assigned are established geographically overlapping with one another.

DESCRIPTION OF EMBODIMENTS

An embodiment of the present invention is described hereinafter with reference to the appended drawings. The same elements are denoted by the same reference numerals where possible, and repeated explanation thereof is omitted.

[Overall Configuration of User Information Administration System]

Figure 1:
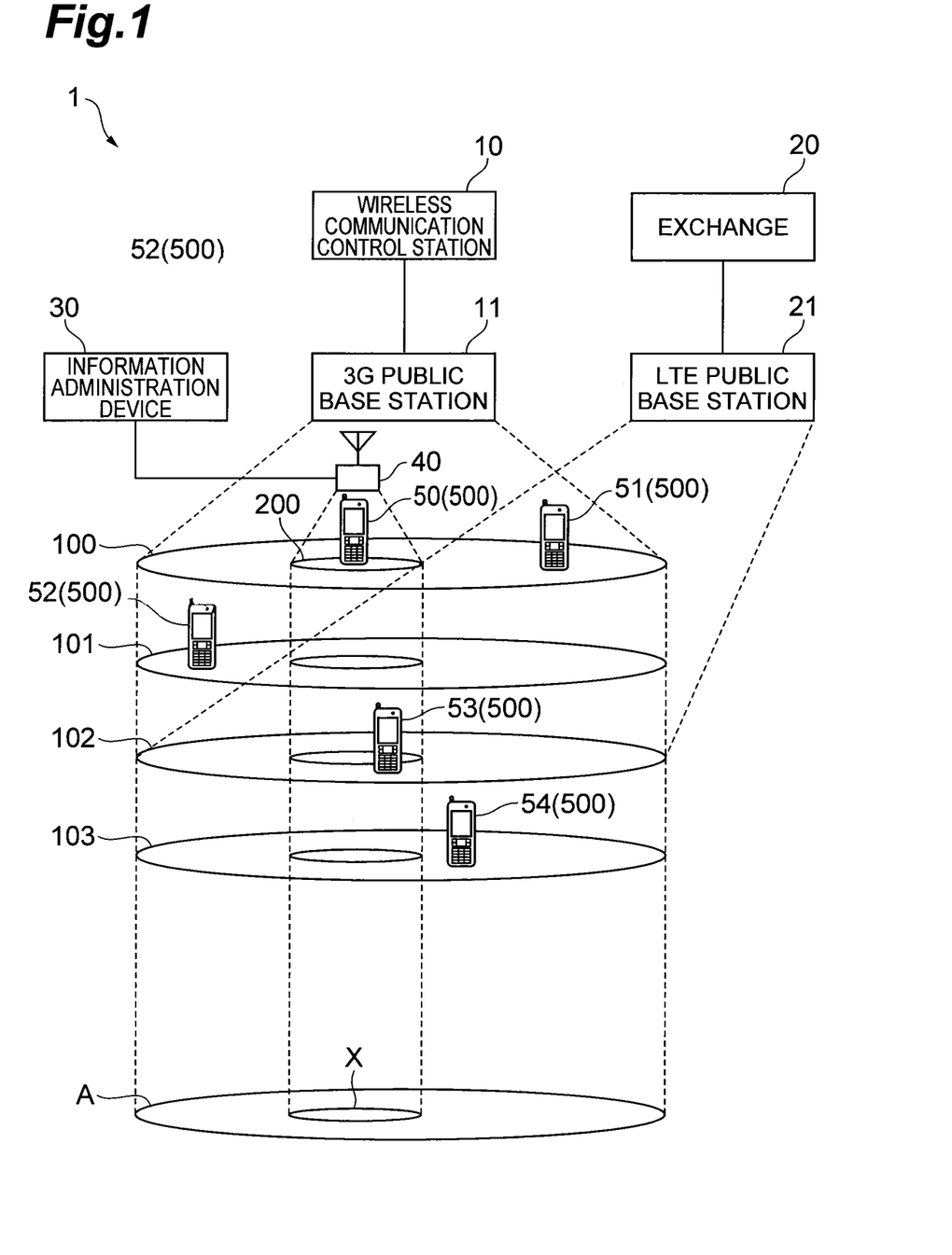
FIG. 1 is a diagram showing a system configuration of a user information administration system according to an embodiment.

FIG. 1 is a diagram showing a system configuration of a user information administration system 1 according to an embodiment. As shown in FIG. 1, the user information administration system 1 includes a 3G public base station 11 (first base station in CLAIMS) and a wireless communication control station 10 that form a 3G (3rd Generation) wireless communication system, an LTE public base station 21 (first base station in CLAIMS) and a exchange 20 that form an LTE (Long Term Evolution) wireless communication system, a base station 40 (second base station in CLAIMS) that forms a radio cell in the region within radio cells formed by the 3G public base station 11 and the LTE public base station 21, and an information administration device 30 connected for communication with the base station 40. In the user information administration system 1, the 3G wireless communication system and the LTE wireless communication system may coexist.

The 3G public base station 11 forms radio cells 100 and 101 (first region in CLAIMS) with different frequencies. Further, the LTE public base station 21 forms radio cells 102 and 103 (first region in CLAIMS) with different frequencies. Note that the radio cells formed by the 3G public base station 11 and the radio cells formed by the LTE public base station 21 have different frequencies. Further, it is assumed that the radio cells 100, 101, 102 and 103 are formed to overlap at least on a given region A. Furthermore, although the 3G public base station 11 and the LTE public base station 21 respectively form two radio cells in this example, the number of radio cells to be established are not limited thereto. In FIG. 1, the radio cells 100, 101, 102 and 103 formed to include the region A are illustrated separately in a hierarchical manner.

Further, a plurality of mobile stations 50, 51, 52, 53 and 54 (hereinafter, those mobile stations are collectively referred to as mobile stations 500) are located in the radio cells 100, 101, 102 and 103. Specifically, the mobile stations 50 and 51 are located in the radio cell 100 formed by the 3G public base station 11, and the mobile station 52 is located in the radio cell 101 formed by the 3G public base station. Further, the mobile station 53 is located in the radio cell 102 formed by the LTE public base station 21, and the mobile station 54 is located in the radio cell 103 formed by the LTE public base station 21.

The base station 40 is configured so that a radio cell 200 (second region in CLAIMS) formed by the base station 40 is identical to a target region X in which it is desired to find the mobile stations 500 using the user information administration system 1. Note that, as the base station 40, a femto base station (Home NodeB/Home eNodeB) that is equipped with automatic configuration for facilitating installation and installed in a small area such as home may be used.

It should be noted that each of the information administration device 30, the base station 40 and the mobile stations 500 has a basic configuration of a typical information processing device (specifically, CPU, RAM, ROM, an input device for inputting information, commands and the like, a communication device that performs communication with the outside, a storage device that stores information, an output device such as display and the like) as a matter of course, though not shown.

[Detailed Configurations of Information Administration Device and Base Station]

Figure 2:
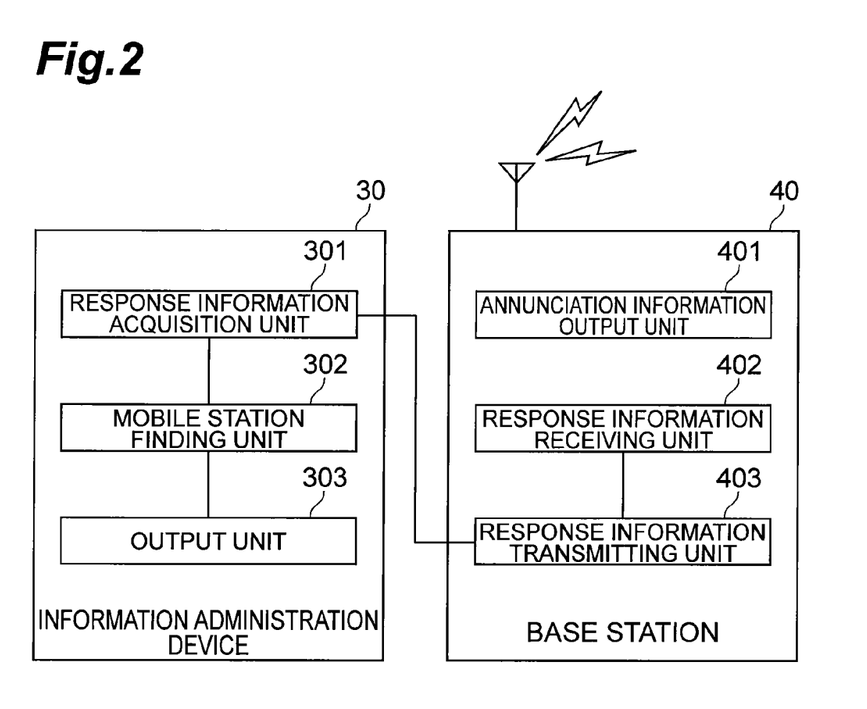
FIG. 2 is a diagram showing a user information administration device and a base station.

The configurations of the information administration device 30 and the base station 40 are described hereinafter in detail. FIG. 2 is a diagram showing the detailed configurations of the information administration device 30 and the base station 40. As shown in FIG. 2, the base station 40 includes an annunciation information output module 401 that outputs annunciation information, a response information receiving module 402 that receives response information transmitted from the mobile stations 500, and a response information transmitting module 403 that transmits the received response information to the information administration device 30.

In the base station 40, Routing Area information (which is hereinafter referred to simply as "RA") and Location Area information (which is hereinafter referred to simply as "LA") to be used for communication with the mobile stations 500 are set so that at least one of them is different from RA and LA of the radio cells 100, 101, 102 and 103. Further, the base station 40 forms the radio cell 200 for each of the frequencies corresponding to the radio cells 100, 101, 102 and 103.

Figure 3:
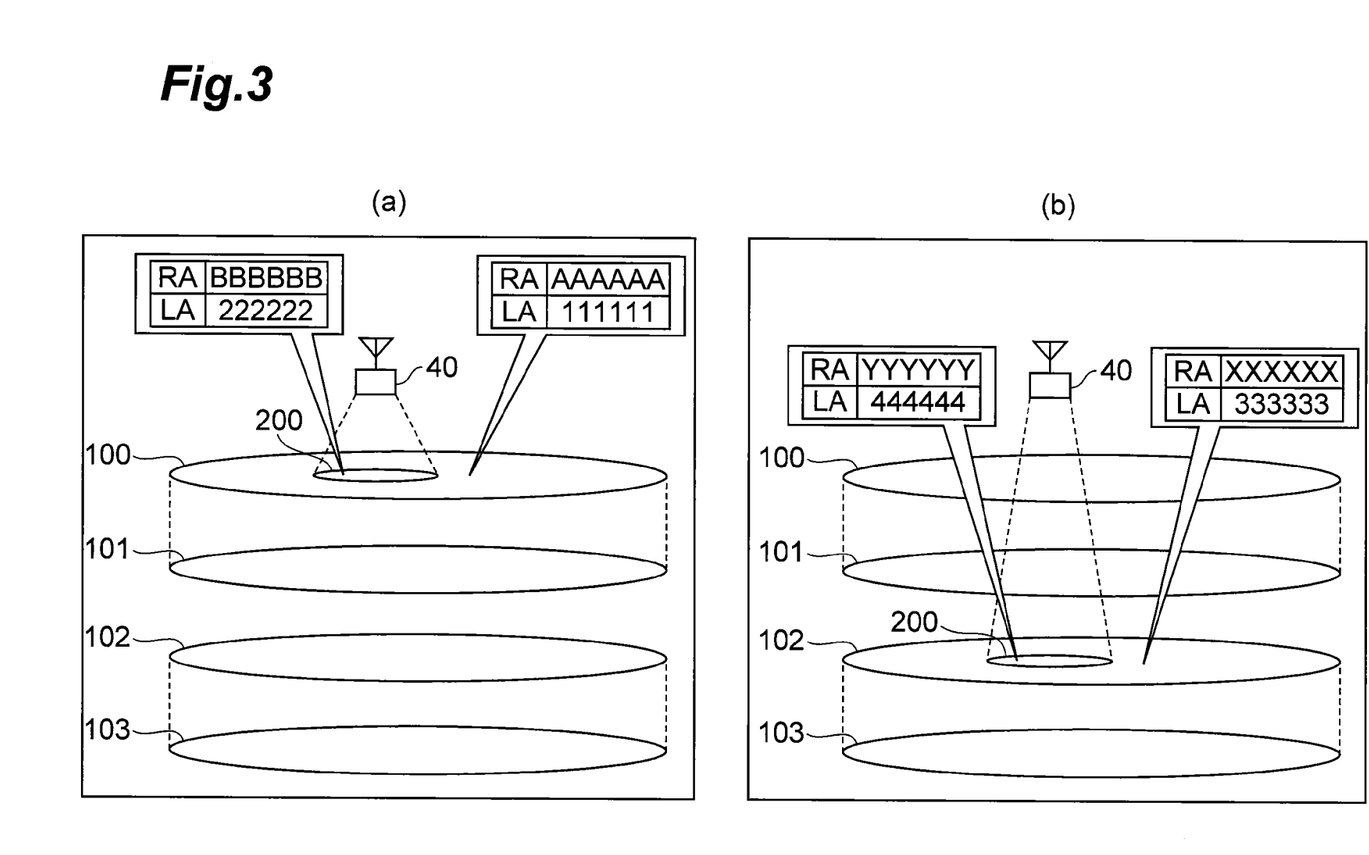
FIG. 3 is a diagram showing RA/LA set to each radio cell.

FIG. 3 shows examples of RA and LA that are set to the base station 40. As shown in FIG. 3(a), RA and LA are set to the base station 40 so that, when RA of the radio cell 100 formed by the 3G public base station 11 is "AAAAAA" and LA of the same is "111111", RA of the radio cell 200 formed for the frequency corresponding to the radio cell 100 is "BBBBBB" and LA of the same is "222222". Likewise, as shown in FIG. 3(*b*), RA and LA are set to the base station 40 so that, when RA of the radio cell 102 formed by the LTE public base station 21 is "XXXXXX" and LA of the same is "333333", RA of the radio cell 200 formed for the frequency corresponding to the radio cell 102 is "YYYYYY" and LA of the same is "444444".

Note that the 3G public base station 11 and the LTE public base station 21 output annunciation information to each of the radio cells. Therefore, at the time of setting the base station 40, RA and LA may be extracted from the annunciation information of the radio cells 100, 101, 102 and 103, and RA and LA different from the extracted RA and LA may be automatically set as RA and LA of the base station 40.

Referring back to FIG. 2, the annunciation information output module 401 forms the radio cell 200 with a frequency corresponding to each of the radio cells 100, 101, 102 and 103 and outputs annunciation information to the target region X based on the set RA and LA. The annunciation information is to announce in which radio cell the mobile station 500 is located to the mobile station 500.

The mobile station 500 transmits response information for announcing the position of the mobile stations 500 to the base station 40 upon detecting a change of the received annunciation information (LA or RA) due to movement or the like of the mobile stations 500. Specifically, the mobile station 500 detects a change of the annunciation information when it enters or leaves the radio cell 200, and transmits the response information. The response information receiving module 402 of the base station 40 receives the response information transmitted from the mobile station 500 that has entered or left the radio cell 200. The response information transmitting module 403 transmits the received response information to the information administration device 30.

A response information acquisition module 301 of the information administration device 30 acquires the response information transmitted from the response information transmitting module 403 of the base station 40. A mobile station finding module 302 finds the number of mobile stations 500 located in the radio cell 200 formed by the base station 40 based on the acquired response information, and performs various statistical work or the like based on the number of mobile stations 500. Further, the mobile station finding module 302 calculates dynamic state information of the mobile stations in an exhaustive manner, including a result of finding the mobile stations obtained from another base station. The statistical work includes extracting information of users of the mobile stations 500 located within the target region X from an external database that stores attribute information of users of the mobile stations 500 and performing statistical work, for example. An output module 303 outputs a processing result of the mobile station finding module 302. The term "output" broadly includes display output and print output as a matter of course. Specifically, the processing result may be displayed on a display or the like, printed from a printer or the like, or both displayed and printed.

[Process of Finding Mobile Stations]

Figure 4:
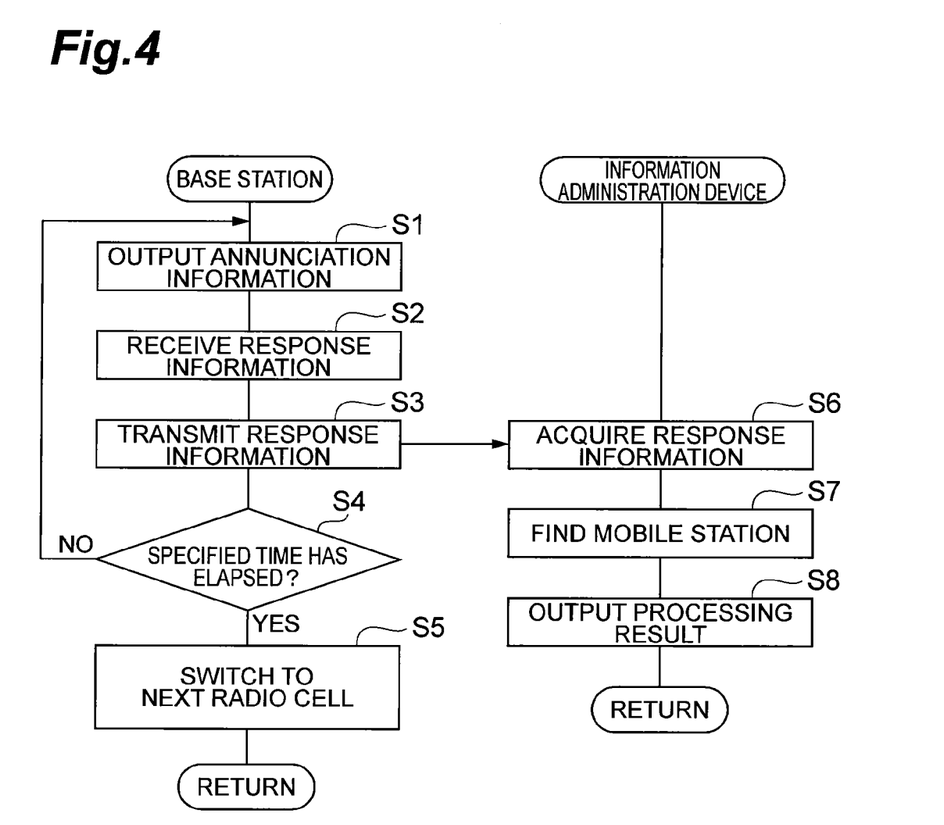
FIG. 4 is a flowchart showing the flow of a mobile station finding process.
Figure 5:
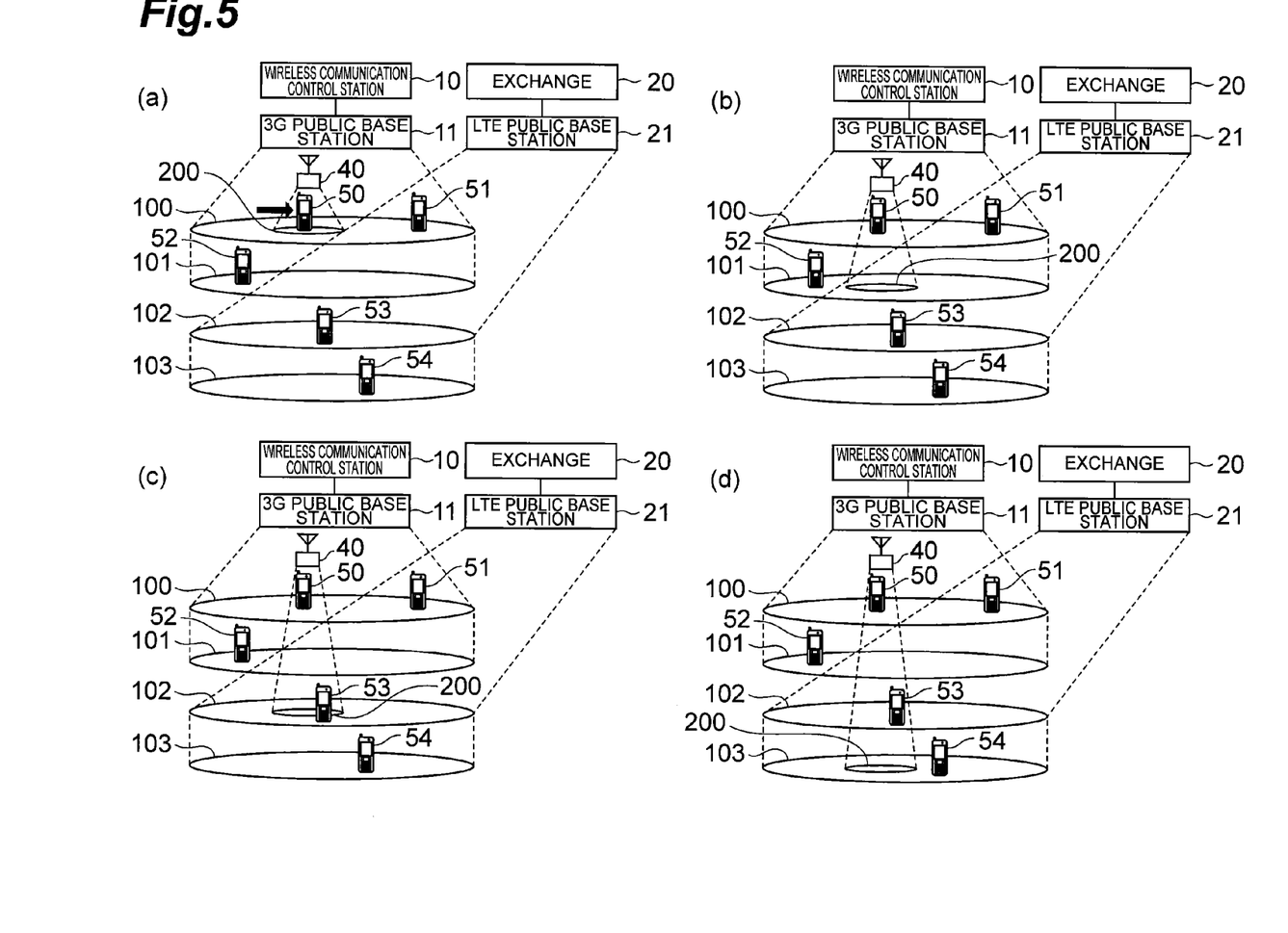
FIG. 5 is a diagram showing the way a base station sequentially forms a radio cell.

A process that the base station 40 sequentially forms the radio cell 200 for each of the frequencies corresponding to the radio cells 100, 101, 102 and 103 and finds the mobile stations 500 is described hereinbelow. This is a process of finding the mobile stations 500 located within the target region X by the information administration device 30, that is, making the mobile stations 500 recognize that they are within the radio cell 200 formed by the base station 40 and notify that to the information administration device 30 side. FIG. 4 is a flowchart showing the flow of the mobile station finding process, and FIG. 5 is a diagram showing the way the base station 40 sequentially forms the radio cell 200 for each of the frequencies corresponding to the radio cells 100, 101, 102 and 103. Note that, in this embodiment, the base station 40 sequentially forms the radio cell 200 in the radio cells 100, 101, 102 and 103 by switching the frequency of the radio cell 200 to be formed every specified time (for example, one minute), and repeats this processing.

First, the annunciation information output module 401 of the base station 40 decides the frequency of the radio cell 200 to be formed first and forms the radio cell 200 according to predetermined conditions, and outputs annunciation information into the radio cell 200 (Step S1 (annunciation information output step in CLAIMS)). Specifically, as shown in FIG. 5(*a*), the radio cell 200 with the frequency corresponding to the radio cell 100 is formed in the radio cell 100 according to predetermined conditions, and annunciation information is transmitted into the radio cell 200.

In the case where the mobile station 50 enters the radio cell 200 when the annunciation information output module 401 is outputting the annunciation information as shown in FIG. 5(*a*), the mobile station 50 detects that the received annunciation information has changed from the annunciation information transmitted from the 3G public base station 11 to the annunciation information transmitted from the base station 40 and thereby transmits response information. The response information receiving module 402 receives the response information transmitted from the mobile station 50 (Step S2 (response information receiving step in CLAIMS)), and the response information transmitting module 403 transmits the received response information to the information administration device 30 (Step S3 (response information transmitting step in CLAIMS)). Although the case where the mobile station enters the radio cell 200 is described in this example, in the case where the mobile station leaves the radio cell 200 also, the leaving from the radio cell 200 can be detected by transmitting the response information that has been transmitted from the leaving mobile station to the 3G public base station 11 or the LTE public base station 21 to the information administration device 30. Note that the response information transmitted from the response information transmitting module 403 may be information obtained by processing the response information received by the response information receiving module 402 as long as it contains information indicating whether the mobile station 50 is located within the radio cell 200 or not.

The annunciation information output module 401 determines whether a specified time has elapsed from the formation of the radio cell 200 (Step S4). When the specified time has not elapsed (NO in Step S4), the process returns to Step S1 to repeat the process of continuously outputting the annunciation information into the radio cell 200 and receiving the response information transmitted from the mobile station 500 that has entered or left the radio cell 200.

On the other hand, when the specified time has elapsed (YES in Step S4), the annunciation information output module 401 selects the frequency to form another radio cell 200, changes the settings of each module (Step S5), and returns to Step S1 to perform the above-described processing. As a result, as shown in FIG. 5(*b*), the radio cell 200 is formed in the radio cell 101 formed by the 3G public base station 11, and the annunciation information is output from the annunciation information output module 401 into the radio cell 200, and thereby the response information can be acquired from the mobile station in the same way as above. In this manner, the base station 40 can sequentially acquire the response information from the mobile stations 500 located in each of the radio cells by switching the radio cell 200 in the radio cells 100, 101, 102 and 103 every specified time as shown in FIGS. 5(a), 5(b), 5(c) and 5(d).

Referring back to FIG. 4, when the response information is transmitted from the response information transmitting module 403 of the base station 40, the response information acquisition module 301 of the information administration device 30 acquires the transmitted response information (Step S6 (response information acquisition step in CLAIMS)). The mobile station finding module 302 finds the number of mobile stations located within the target region X based on the acquired response information, and performs various statistical work or the like based on the number of mobile stations (Step S7 (mobile station finding step in CLAIMS)). Further, the mobile station finding module 302 calculates dynamic state information of the mobile stations in an exhaustive manner, including a result of finding the mobile stations obtained from another base station (Step S7 (mobile station finding step in CLAIMS)). The output module 303 outputs a processing result of the mobile station finding module 302 (Step S8 (output step in CLAIMS)).

As described above, the radio cell 200 is sequentially formed by the base station 40 for all the frequencies located in the target region X (the frequencies at which the radio cells are formed by the 3G public base station 11 and the LTE public base station 21). By sequentially forming the radio cell 200 for each of the frequencies, it is possible to find the mobile stations located within the target region X (the radio cell 200) in an exhaustive manner for all the frequencies, and there is no need to place radio transmitter-receivers corresponding to all frequencies in the base station 40. Thus, the radio cell 200 formed by the base station 40 serves not as a radio cell to provide communication but as a sensor function to find the mobile stations located in this region. Further, the radio cell 200 may provide communication like the normal base station. Note that, when there is a mobile station that is performing communication at the timing of switching the radio cell 200 for each frequency, handover may be made to the radio cell 100, 101, 102 or 103 that includes the radio cell 200 formed by the base station 40.

Further, as a method to uniquely identify the target region X (the radio cell 200 formed by the base station 40) on the information administration device 30 side, there is a method of using a nationally unique ID which is capable of identifying the radio cell such as Cell Identity, and, in this case, the nationally unique ID is notified to the information administration device 30 side in the mobile station position registration process using the annunciation information and the response information, and therefore the target region X can be uniquely identified from the ID on the information administration device 30 side. As another method, by setting nationally unique RA/LA to the radio cell 200 formed by the base station 40, the RA/LA can be used as a nationally unique ID which is capable of uniquely identifying the target region X on the information administration device 30 side.

[Operation and Effect]

The operation and effect of the user information administration system 1 according to the embodiment are described hereinbelow.

According to the embodiment described above, the base station 40 outputs the annunciation information which corresponds to a plurality of radio cells established by the 3G public base station 11 and the LTE public base station 21 and which is different from the annunciation information output from the 3G public base station 11 and the LTE public base station 21 into the target region X and forms the radio cell 200. The mobile station 500 that enters the radio cell 200 receives the annunciation information of the radio cell 200 and executes the position registration process. The information administration device 30 can thereby find the mobile stations 500 based on the position registration process even in the environment where a plurality of different radio cells to which different frequencies are assigned are established geographically overlapping with one another.

Further, in the communication system where the 3G system (the wireless communication control station 10, the 3G public base station 11) or the LTE system (the exchange 20, the LTE public base station 21), or both of them exist in 3GPP (3rd Generation Partnership Project) also, the base station 40 outputs the annunciation information different from the annunciation information of the other radio cells into the radio cell 200, thereby allowing finding of the mobile stations 500.

Further, by installing the base station 40 so as to cover the given target region X such as a store, booth or venue and finding the mobile stations 500 located within the target region X, it is possible to obtain the number of visitors, statistical data of attribute information of visitors and the like. Further, because the mobile stations 500 located within the target region X can be found, it is possible to deliver information such as a coupon only to visitors based on the information of the mobile stations 500 within the target region X.

Further, according to the embodiment, because the base station 40 sequentially forms the radio cell 200 in the region within the radio cells formed by the 3G public base station 11 and the LTE public base station 21, there is no need to implement a wireless communication device that outputs the annunciation information corresponding to each frequency and receives the response information for each of frequencies, thus allowing the base station 40 to have a simple configuration.

Further, according to the present invention, because the annunciation information is set based on RA and LA which are provided for all the mobile stations 50, the annunciation information output module 401 can easily generate the annunciation information different from the annunciation information of the other radio cells.

It should be noted that the present invention is not limited to the embodiment described above.

For example, although the radio cell 200 is sequentially formed in the radio cells 100, 101, 102 and 103 by switching the frequency of the radio cell 200 formed by the base station 40 every specified time (for example, one minute) in the above-described embodiment, the timing and the cycle may be set as appropriate, such as forming the radio cell 200 in the radio cell 100 for 30 seconds, halting the formation of the radio cell 200 for two minutes and then forming the radio cell 200 in the radio cell 101 for 30 seconds, for example.

Further, although the annunciation information output module 401 outputs the annunciation information based on the set RA and LA, it may output the annunciation information using information of either RA or LA. In this case also, the annunciation information of the radio cells 100, 101, 102 and 103 and the annunciation information of the radio cell 200 are different, allowing finding of the mobile stations 500.

REFERENCE SIGNS LIST

1 . . . User information administration system, 10 . . . Wireless communication control station, 11 . . . 3G public base station, 20 . . . Exchange, 21 . . . LTE public base station, 30 . . . Information administration device, 40 . . . Base station, 50 to 54, 500 . . . Mobile station, 100 to 103, 200 . . . Radio cell, 301 . . . Response information acquisition module, 302 . . . Mobile station finding module, 303 . . . Output module, 401 . . . Annunciation information output module, 402 . . . Response information receiving module, 403 . . . Response information transmitting module, X . . . Target region

The invention claimed is:

1. A user information administration system including a first base station for controlling communication of mobile stations located in a first region with a plurality of frequencies assigned, a second base station having a communication range of a second region within the first region and smaller than the first region, and an information administration device connected for communication with the second base station, the second base station comprising:
an annunciation information output module that outputs annunciation information different from annunciation information output from the first base station to the second region;
a response information receiving module that receives response information output by a mobile station upon detecting a change of the annunciation information from the mobile station; and
a response information transmitting module that transmits the response information received by the response information receiving module to the information administration device,
wherein the annunciation information output module sequentially outputs annunciation information corresponding to each frequency in a specified order for each of a plurality of frequencies set by the first base station, and the information administration device comprising:
a response information acquisition module that acquires the response information transmitted from the response information transmitting module;
a mobile station finding module that finds the mobile station within the second region based on the acquired response information; and
an output module that outputs a finding result by the mobile station finding module.

2. The user information administration system according to claim 1, wherein
in the second base station, at least one of Routing Area information different from Routing Area information set by the first base station and Location Area information different from Location Area information set by the first base station is set for each of the plurality of frequencies, and the annunciation information output module outputs the annunciation information based on the set information.

3. The user information administration system according to claim 1, wherein
the mobile station finding module further calculates dynamic state information of the mobile station based on the finding result of the mobile station, including a finding result of the mobile station obtained from another base station, and
the output module further outputs the dynamic state information calculated by the mobile station finding module.

4. A user information administration method executed in a user information administration system including a first base station for controlling communication of mobile stations located in a first region with a plurality of frequencies assigned, a second base station having a communication range of a second region within the first region and smaller than the first region, and an information administration device connected for communication with the second base station, the method comprising:
an annunciation information output step of outputting annunciation information different from annunciation information output from the first base station to the second region by the second base station;
a response information receiving step of receiving response information output by a mobile station upon detecting a change of the annunciation information from the mobile station by the second base station;
a response information transmitting step of transmitting the response information received in the response information receiving step to the information administration device by the second base station;
a response information acquisition step of acquiring the response information transmitted in the response information transmitting step by the information administration device;
a mobile station finding step of finding the mobile station within the second region based on the acquired response information by the information administration device; and
an output step of outputting a finding result in the mobile station finding step by the information administration device,
wherein the annunciation information output step sequentially outputs annunciation information corresponding to each frequency in a specified order for each of a plurality of frequencies set by the first base station.

* * * * *